Jan. 11, 1955  G. B. DOREY  2,699,231
BRAKE SLACK ADJUSTER
Filed June 28, 1952  3 Sheets-Sheet 3
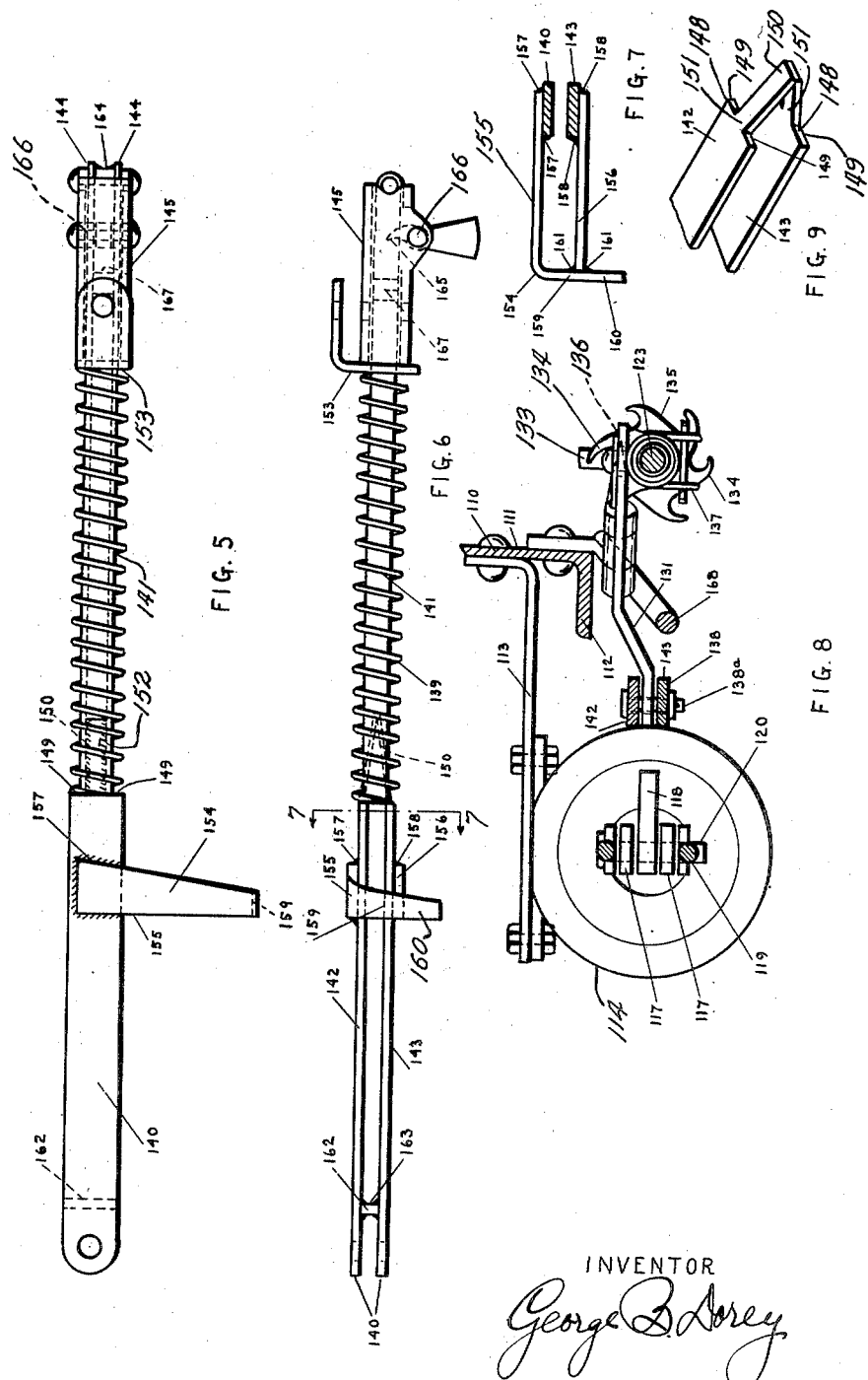
INVENTOR
George B. Dorey United States Patent Office 2,699,231
Patented Jan. 11, 1955

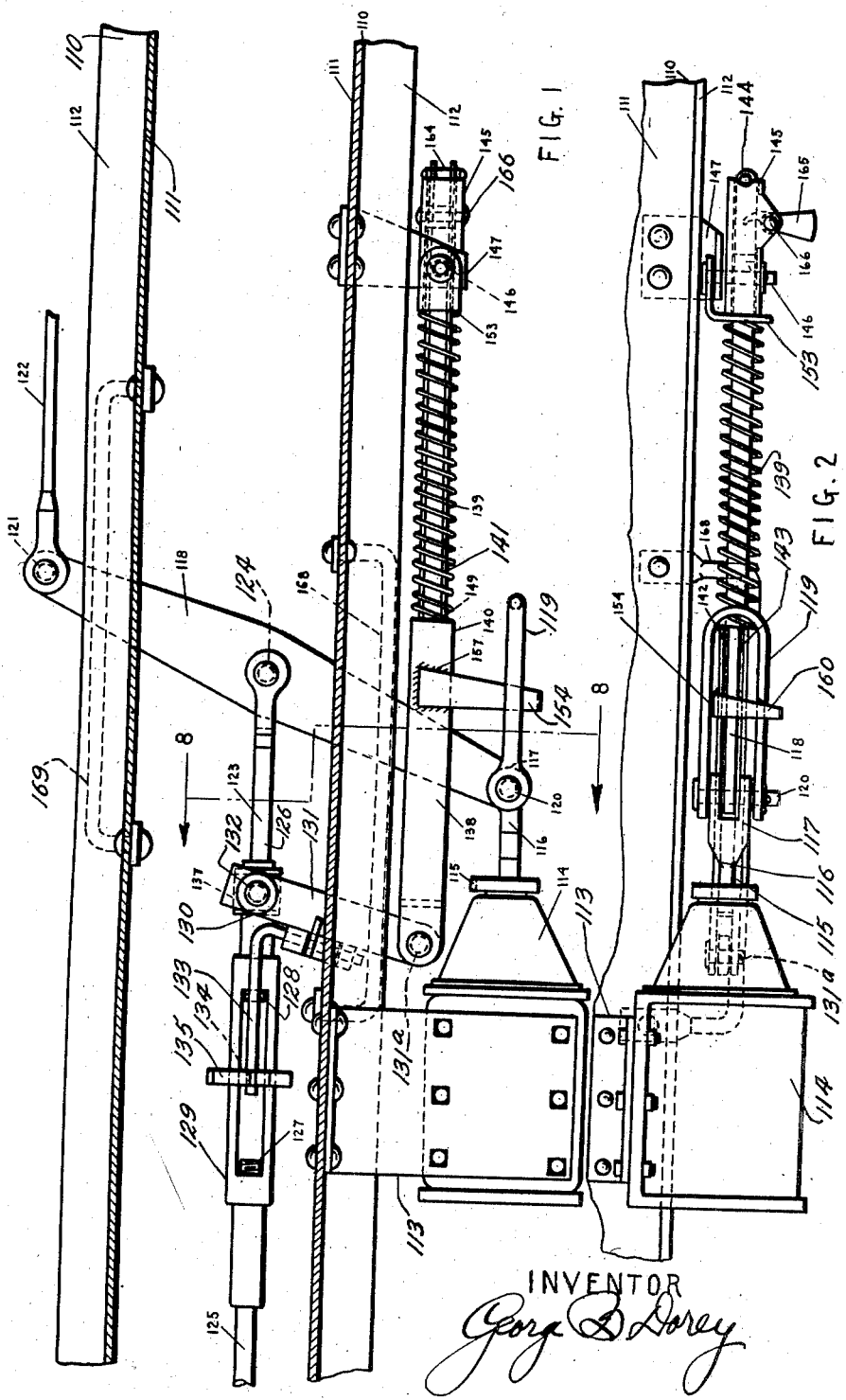

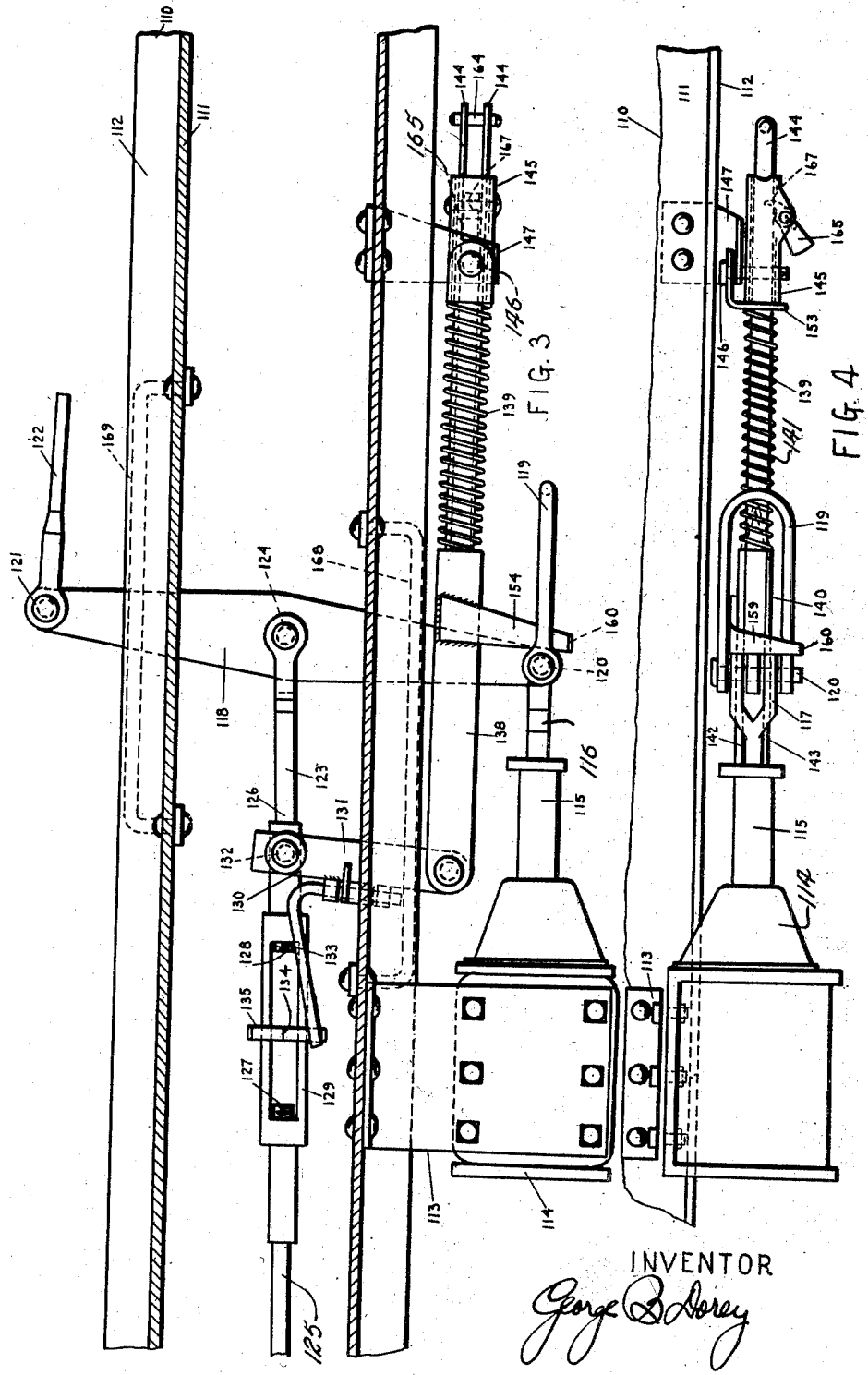

2,699,231
BRAKE SLACK ADJUSTER

George B. Dorey, Westmount, Quebec, Canada, assignor to Continental Transport Appliances, Limited, Montreal, Quebec, Canada, a corporation of Canada Application June 28, 1952, Serial No. 296,230

3 Claims. (Cl. 188—198)

The invention relates to an improved type of brake slack adjuster such as used in railway cars and the like and is by way of an improvement on my co-pending United States patent application Serial Number 179,046 filed August 12, 1950, now Patent No. 2,646,137.

The objects of the invention among others are to provide a slack adjuster employing an operating spring adapted to be tensioned by movement of the brake cylinder push rod and so related thereto as to eliminate side thrust on the said push rod; to provide spring mechanism for operating a take up device embodying a movable operating rod located at one side of the push rod and provided with shouldered means extending in the path of movement of the push rod and engageable by the latter; to provide an elongated clevis on the end of a push rod which embraces laterally extending shouldered means leading from an adjacently disposed operating rod; and to provide a slack adjuster operating rod extending across the plane of a brake lever and having spaced guiding walls above and below the said lever for limiting relative vertical movement between said lever and operating rod.

For further comprehension of the invention reference may be had to the accompanying drawings wherein:

Figure 1 is a plan view of a portion of a railway car structure showing the improved slack adjuster applied thereto, said view showing the brake parts in released position.

Figure 2 is a side elevational view of the structure shown in Fig. 1.

Figure 3 is a view similar to Fig. 1 except that the brake and slack adjuster parts are shown as positioned with the operating spring of the take up mechanism tensioned and the spring energy tension maintained by a holding pawl.

Figure 4 is a side elevational view of the structure shown in Fig. 3.

Figure 5 is a detached plan view on an enlarged scale of the take up operating rod and spring assembly.

Figure 6 is a side elevational view of the assembly shown in Fig. 5.

Figure 7 is a vertical sectional view taken on a line 7—7 of Fig. 6.

Figure 8 is a vertical sectional view on an enlarged scale taken on a line 8—8 of Fig. 1.

Figure 9 is a fragmentary perspective view of a portion of the operating rod showing the construction at the junction of the horizontal and vertical sections.

Referring to the drawings, the car structure is indicated generally by a pair of center sill members 110—110 each including a vertical web 111 and an outstanding lower flange 112. Secured to the web 111 of one of the center sill members is a bracket plate 113 to which is bolted or otherwise secured a brake cylinder 114. The said brake cylinder is provided with a hollow piston extension 115 within which is loosely mounted a push rod 116. The outer end of the push rod 116 is formed with a pair of jaws 117—117 which are spaced apart to accommodate a brake lever 118 therebetween and an elongated clevis member 119 embraces the said jaws and projects forwardly beyond the push rod. A pivot 120 extends through the clevis, push rod jaws and brake lever to form a pivoted connection between the said respective members.

The lever 118 at the end remote from the push rod connects by a pivot 121 with a top rod 122 which in turn leads to the brake of one of the trucks (not shown).

The said lever 118 at an intermediate location is interconnected with the brake leading to the companion truck (not shown) through the medium of a center connection 123 which is pivotally connected with the said lever 118 by a pivot 124.

The said connection 123 is divided lengthwise into two sections 125 and 126 and the facing ends of respective sections are screwthreaded to present right and left hand threads as indicated at 127 and 128 respectively. The said screwthreaded ends 127 and 128 are united by a complementary screwthreaded turnbuckle member 129 whereby the length of the connection may be varied by rotation of said turnbuckle member. The said turnbuckle member constitutes the take up device of the brake leverage system as composed by the push rod and levers with the interconnecting rod and is arranged and adapted to function automatically upon excessive movement of the push rod to take up slack.

Rotation of the turnbuckle member 129 in a take up direction is effected through the medium of a bell crank lever 130 having an actuating arm 131 pivoted at 132 on the take up device to swing in a substantially horizontal plane and pivotally mounted on said arm 131 for up and down movement is a pawl arm 133 which is adapted to engage with teeth 134 of a ratchet wheel 135 which in turn is rigidly mounted on the turnbuckle 129. The pivot 132 is preferably in the form of a trunnion 136 formed integrally with a saddle shaped member 137 which straddles the take up device and permits relative revoluble movement between the take up device and the saddle.

Movement of the bell crank lever in a take up direction is effected through the medium of an operating rod 138 acted upon by a spring 139 which is tensioned during forward movement of the push rod as will be hereinafter explained.

The operating rod 138 which extends in the general direction of and is located at one side of the push rod 116 is preferably formed of two sections 140 and 141 respectively. The section 140 includes flat bars 142 and 143 which extend across the plane of the brake lever 118 and are disposed respectively above and below the lever to form a pair of guiding walls for restraining up and down movement of the rod member 138 in relation to the lever and said respective walls are extended to straddle the actuating arm 131 and receive a pivot 131$a$ to form the connection with the take up device. The section 141 consists of a pair of vertically disposed walls 144—144 which extends through a guide bracket 145 which in turn is pivotally mounted at 146 on a stationary bracket 147.

The said respective horizontally and vertically disposed sections 140 and 141 are preferably disposed in overlapping relation and welded together and to this end the horizontally extending walls 142 and 143 are coped out at 148 to present shoulders 149 and narrowed portions 150 which are deflected at 151 to lie between the vertical wall sections 141 and the said overlapping portions are welded together at 152. The spring 139 which is interposed between the shoulders 149 and the end wall 153 of the swivelling bracket 145 encircles the vertically disposed wall sections 141.

The operating rod member being disposed appreciably to one side of the push rod there is provided a shouldered structure 154 which extends laterally from the section 140 to lie in the path of movement of the push rod and be engaged thereby. The shouldered structure is preferably in the form of upper and lower arms 155 and 156 which are respectively welded to the plate sections 140 and 141 as indicated at 157 and 158 respectively. The upper arm 155 is bent downwardly to present a vertically disposed wall 159 which is extended downwardly below the level of the lower arm 158 to form a stop 160 to limit sideways swivelling movement of the clevis, it being understood that the said shouldered structure is extended within the confines of the clevis. The wall 159 is preferably welded to the lower arm 156 at 161.

The horizontal sections 142 and 143 adjacent the pivotal connection 132 are maintained in spaced relation by a separator 162 which is welded in place as indicated at 163 and the vertical wall members 144 are maintained in spaced relation by a separator 164 at the outer end of the bar.

The spring 139 is tensioned during the forward movement of the push rod in a brake applying direction by reason of the engagement between the end of the push rod jaws and the shouldered structure 154 of the operating rod and on release of the spring tension the operating rod is moved in the reverse direction operating to rotate the take up device in a take up direction by the interengagement between the pawl arm 133 and teeth 134 of the ratchet wheel 135.

In order to ensure uniform operation of the slack adjuster to effect take up adjustment at a given extent of push rod travel there is provided holding means for retaining the spring tension until excessive slack develops in the brake system.

The holding means include a weighted pawl 165 pivotally mounted at 166 on the bracket 145 and arranged to engage with a ratchet tooth 167 carried by the operating rod. The tooth 167 at a predetermined extent of piston travel overrides the pawl and allows the latter to gravitate to a vertical position and release the spring tension.

In the normal operation of the brake it is required that piston travel be maintained between 7 and 9 inches and it is customary in the case of automatically operable slack adjusters to so calibrate the slack adjuster as to make adjustment at 8 inches and to this end my improvement provides for holding the spring tension at 7¼ inches of travel and allowing for complete release of the spring at 8 inches of travel.

The mode of operation and advantages of the improvement may be more fully understood by following out the sequence of operations involved in a take up cycle. Assuming the parts in released position as shown in Figs. 1 and 2, the admission of compressed air in the brake cylinder 114 forces the push rod 116 forwardly until engagement is effected between the end of the said push rod 116 and the shouldered portion of the operating rod 138 after which the latter moves in unison with the push rod and the spring 139 is compressed. Forward movement of the operating rod 138 swings the operating arm 131 of the bell crank lever 130 on its pivot 132 causing the pawl arm 133 to ride freely over the teeth 134 of the ratchet wheel 135 from the position shown in Fig. 1 to that shown in Fig. 3.

Continued forward movement of the operating rod 138 causes the detent of pawl 165 to engage with the toothed portion 167 of the rod and the spring tension is held at 7¼ inches of travel and with the spring maintained in such position the push rod is free to return to release position without in any way interfering with the normal operation of the brake. Successive brake applications may be made with the piston travel varying between 7¼ and 8 inches without release of spring tension but upon the piston travel exceeding 8 inches the tooth overrides the pawl and allows the latter to gravitate to a non-operative position thereby releasing the spring to return the operating rod.

During the return movement of the operating rod under the influence of spring pressure the operating arm 131 of the take up mechanism is moved therewith and the pawl arm 133 having gravitated into ratcheting engagement with one of the teeth of the ratchet wheel 135 such movement of the arm imparts a partial turn to the take up device and thereby shortens the center connection rod 123 which in turn is reflected in lessened travel of the push rod 116.

The improved slack adjuster is simple to apply on the car structure necessitating as it does the attachment of only one stationary bracket to support the swivelling bracket 145 and the support of adjacent parts of the adjuster is carried out by the brake lever 118 which in turn rests on lever supports 168 and 169. The extension of the shouldered portion of the operating rod within the confines of the clevis permits the direct application of pressure on the spring while at the same time permitting the attachment of a hand brake connection directly to the end of the push rod.

What I claim as new is:

1. In a slack adjuster for taking up slack in the brake system of a vehicle, said brake system including: a brake applying rod movable lengthwise forwardly for applying the brake; jaws on the rod; a lever sandwiched between the jaws; an elongated clevis embracing the jaws; and a pintle extending through the said clevis, jaws and lever; a take up device for varying the relation between certain parts of the system; and means for operating the take up device including an operating rod extending lengthwise adjacent the brake applying rod and spaced laterally outwardly therefrom; shouldered means extending laterally from the operating rod to lie in the path of movement of the applying rod to move therewith during forward movement of said rod in the brake applying operation, said shouldered means extending within the confines of the clevis; and a spring tensioned during forward movement of the applying rod and upon release operating to actuate the take up device.

2. In a slack adjuster for taking up slack in the brake system of a vehicle, said brake system including a pressure transmitting cylinder and a brake applying rod actuated thereby for applying the brake, a brake lever pivoted to the said rod; a take up device in the system for varying the relation between certain parts of the system and compensating for slack in the system; the herein described mechanism for operating the take up device including an operating rod extending lengthwise at one side of the brake applying rod and shouldered means extending laterally from the said operating rod and lying in the path of movement of the brake applying rod and arranged to be moved thereby; said operating rod including a section presenting walls spaced to lie on opposite sides of the brake lever and forming guides to limit relative up and down movement between the said rod and lever; a spring tensioned by movement of the rods during the brake applying operation, said spring upon release operating to move the operating rod and actuate the take up device.

3. In a slack adjuster for taking up slack in the brake system of a vehicle, said brake system including a pressure transmitting cylinder and a brake applying rod actuated thereby for applying the brake; a brake lever pivoted to the brake applying rod and extending in a substantially horizontal plane; a take up device in the system for varying the relation between certain parts of the system; mechanism for operating the take up device including an operating rod and a spring acting thereon, said operating rod extending lengthwise along one side of the brake applying rod and across the plane of the lever and connected at one end with the take up device; and a guiding bracket adjacent the opposite end of said operating rod for receiving the said rod, said portion of the rod extending across the plane of the lever consisting of a pair of horizontally disposed plates straddling the lever and said portion of the rod extending through the guiding bracket consisting of a pair of vertically disposed plates spaced apart, said horizontally disposed plates at the juncture of the respective horizontal and vertical portions being coped out to present narrowed portions and shoulders at each side thereof, said narrowed portions being deflected towards each other and extended between the spaced vertically disposed plates and welded thereto; a spring disposed between the shoulders of the horizontally disposed plates and the guiding bracket; and arms extending laterally from the horizontally disposed walls to lie in the path of movement of the brake applying rod for engagement therewith whereby upon movement of the brake applying rod, the spring is compressed and upon release of the spring compression the operating rod is moved in a direction to operate the take up mechanism and take up slack in the brake system.

References Cited in the file of this patent

UNITED STATES PATENTS

| | | |
|---|---|---|
| 636,305 | Wands | Nov. 7, 1899 |
| 795,401 | Leigh | July 25, 1905 |
| 1,060,613 | Mars | May 6, 1913 |
| 1,395,738 | Schechter | Nov. 1, 1921 |
| 2,646,138 | Dorey | July 21, 1953 |

FOREIGN PATENTS

| | | |
|---|---|---|
| 221,555 | Great Britain | Sept. 11, 1924 |